UNITED STATES PATENT OFFICE.

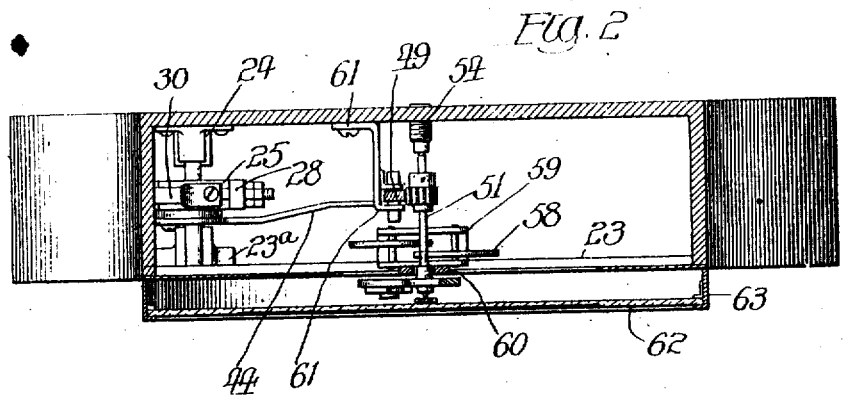
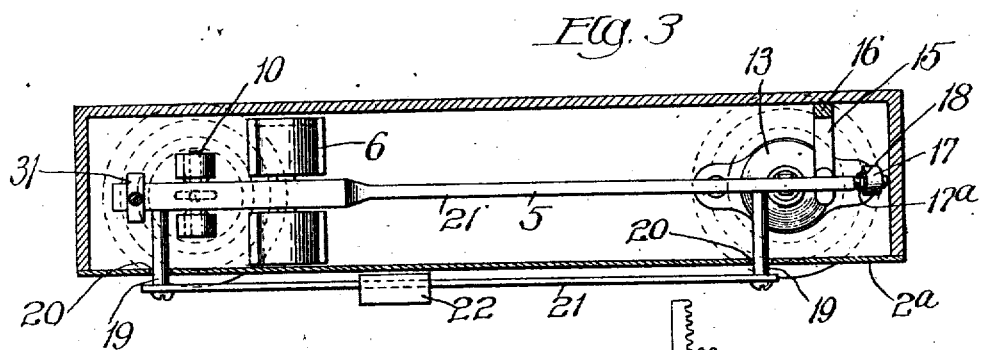
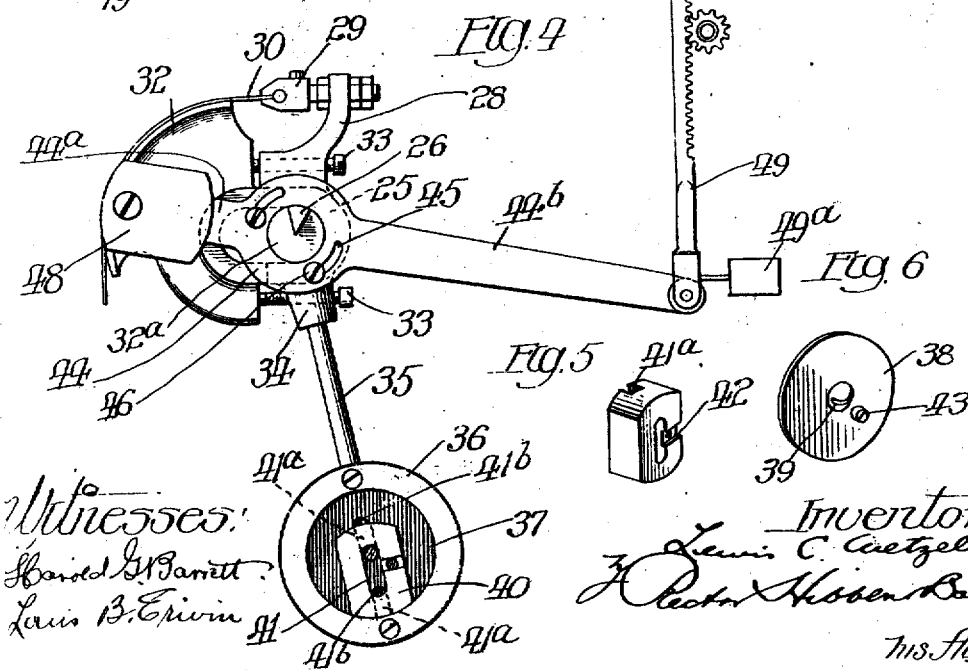

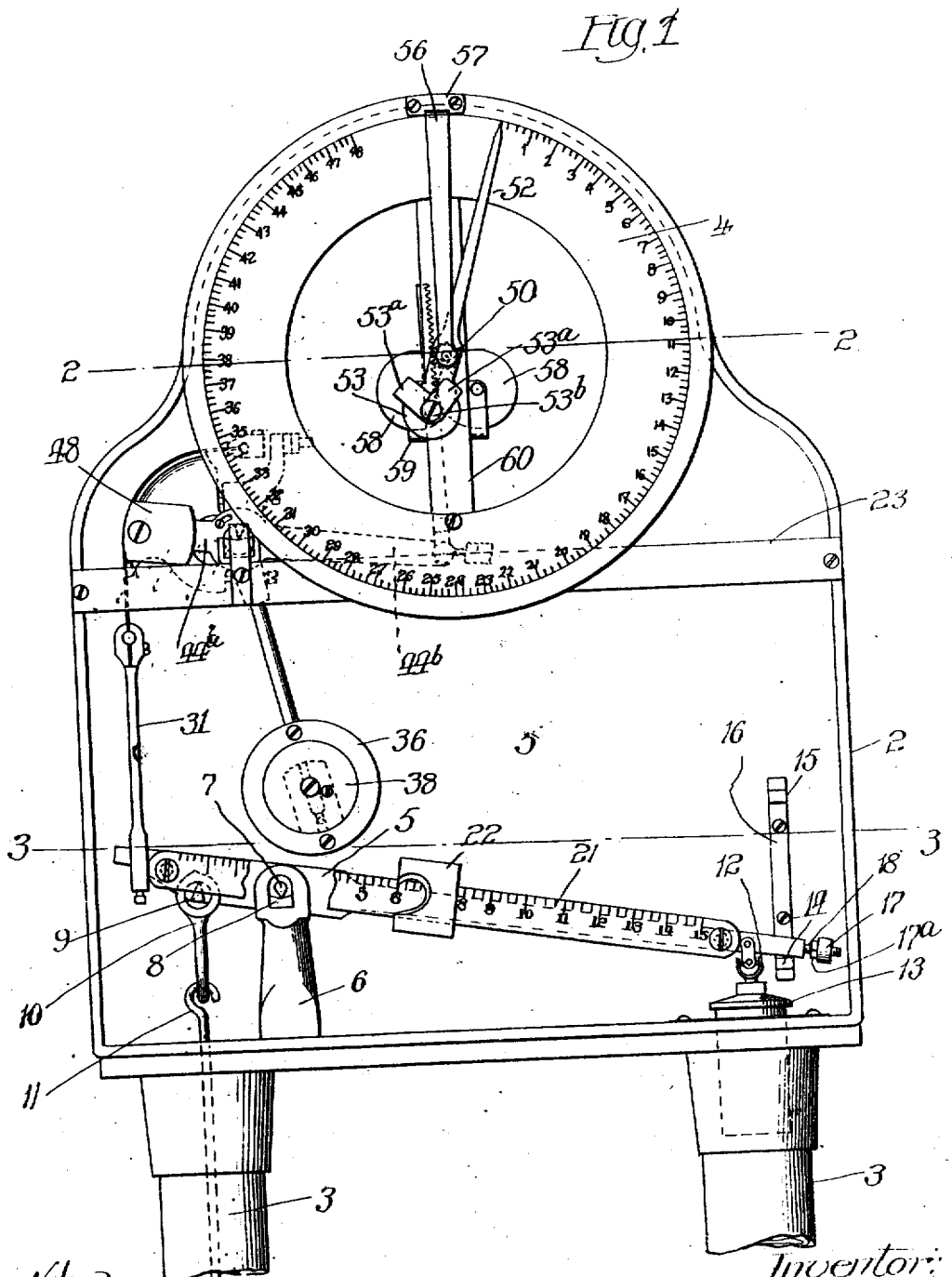

LEWIS C. WETZEL, OF TOLEDO, OHIO, ASSIGNOR, BY MESNE ASSIGNMENTS, TO TOLEDO SCALE COMPANY, OF TOLEDO, OHIO, A CORPORATION OF NEW JERSEY.

WEIGHING-SCALE.

1,262,725.　　　　Specification of Letters Patent.　　Patented Apr. 16, 1918.

Application filed November 30, 1906, Serial No. 345,801. Renewed November 27, 1914. Serial No. 874,352.

*To all whom it may concern:*

Be it known that I, LEWIS C. WETZEL, residing at Toledo, in the county of Lucas and State of Ohio, have invented certain new and useful Improvements in Weighing-Scales, of which the following is a specification.

The principal object of the present invention is to provide a construction of weighing scales which can be conveniently and expeditiously used where one article after another is to be weighed in quick succession as for example in cracker factories in the handling of the filled boxes which arrive at the weighing station over continuously moving conveyers. The present invention provides not only for quick weighing under such conditions but also for accounting for tare, the weight of the box in the case of crackers being usually marked upon the exterior so that the operator of the weighing apparatus can ascertain at a glance how much tare is to be provided for.

With these and incidental objects in view the invention consists in certain novel features of construction and combinations of parts the essential elements whereof are recited in the appended claims and a preferred form of embodiment of which is described in detail hereinafter and fully illustrated in the accompanying drawings.

Of said drawings Figure 1 represents in front elevation weighing apparatus constructed in accordance with the present invention, the front of the inclosing casing being removed and the tare-beam being broken away at one part to disclose the pivotal mountings of the main beam; Fig. 2 represents a horizontal section taken substantially on the line 2—2 of Fig. 1 looking downward; Fig. 3 is a similar view taken substantially on the line 3—3 of Fig. 1; Fig. 4 represents certain of the working parts detached and in front elevation, these parts including a pendulum whose weighted end is shown without a certain cover-plate which closes a circular recess in said weighted end though parts carried by said cover-plate appear in cross-section; Fig. 5 represents in perspective a certain adjustable weight which occupies the said recess of the pendulum; and Fig. 6 represents the said cover-plate in perspective.

A box-like casing 2 is supported upon suitable standards 3 preferably hollow and at its upper part supports on the front side a dial-plate 4 bearing a circular series of marginal gradations appropriately numbered. A scale-beam 5 is pivotally supported intermediate its ends within the casing 2 and between uprights of a standard 6, said beam having knife-edge bearings 7 resting upon blocks 8 within apertures of said uprights. Knife-edge bearings 9 which project from the short arm of the scale-beam support a shackle or hanger 10 which is in turn connected with a depending rod 11, the latter passing down through one of the hollow standards 3 to connect with a platform or other load-supporting means. The longer arm of the scale-beam is linked to the piston rod 12 of a dash-pot 13 suitably mounted in the other hollow standard 3. This longer arm of the scale-beam vibrates between rubber buffers 14 secured to arms 15 of a bracket 16 fastened to the back of the casing 2. A weight 17 is adjustably mounted upon the end of this arm of the scale-beam, the latter being provided with a screw-threaded stem 18 to receive the weight and a lock-nut 17ª to maintain the adjustment, said weight serving to secure exactly the proper balance of the scale-beam. The latter carries a pair of outwardly extending studs 19 which project through slots 20 in the front 2ª of the casing and support between them a tare-beam 21. This beam is suitably graduated to show pounds and fractions of pounds and upon it slides a weight 22 to be employed in the usual manner for overbalancing the scale-beam to the extent of tare.

A cross-bar 23 extends from side to side of the casing 2 at the upper portion thereof and supports the outer bearing 23ª for a pendulum, the inner bearing 24 for the same being supported by a suitable bracket (Fig. 2) secured to the back of the casing. This pendulum comprises a fulcrum portion 25 with knife-edge bearings 26 resting upon blocks of the above-mentioned inner and outer bearings so that the pendulum may swing freely from side to side above the scale-beam 5. The fulcrum of the pendulum is but slightly out of vertical alinement with the fulcrum of the scale-beam and the swing of the pendulum is from a point immediately over the fulcrum of the beam toward the end of the long arm of the latter and back so that no additional lateral space is required to accommodate the pendulum over that which the scale-beam requires and thus a compact arrangement is made possible.

An arm 28 projecting upwardly from the fulcrum portion 25 of the pendulum carries a clamp 29 for holding one end of a strap 30 which at its other end is clamped to a stirrup 31 adjustably engaged with the end of the shorter arm of the scale-beam. This strap overlies the periphery of a segment 32 eccentric to the pendulum and adjustable about a concentric boss 32$^a$ thereof, by means of set-screws 33, one entered through the arm 28 and the other through a depending arm 34 of the fulcrum portion 25. The stem 35 of the pendulum is secured at its upper end in said arm or boss 34 and at its lower end in a weighted disk 36. The latter is formed in its front face with a circular recess 37 covered by a plate 38 secured in place by a centrally-located screw 39. Within the recess 37 is contained a weight 40 slotted as at 41 to embrace the screw 39 and grooved in its rear side as at 41$^a$ to engage studs 41$^b$ projecting from the base of the recess. Said weight is cross-slotted or grooved in its front side as at 42 to receive the inwardly projecting end of a screw-stud 43 secured in the said plate 38. By loosening the screw 39 and rotating the plate 38 the weight 40 can be adjusted lengthwise the pendulum by reason of the eccentric action of the stud 43 against the sides of the groove 42. In this manner the counter-balancing properties of the pendulum can be accurately regulated without necessitating shifting of the entire weighted end of the pendulum. It will be seen that the construction described provides for extreme nicety of adjustment in this regard.

There is adjustably secured to the segment 32 a horizontally-disposed lever or beam comprising a central portion 44 loosely embracing the boss 32$^a$ and formed with arc-slots 45 receiving screws 46; a relatively short arm 44$^a$ projecting to one side of the central part and carrying a counterbalancing weight 48; and a relatively long arm 44$^b$ projecting oppositely from said central part and extending to a point about midway the inclosing casing where it is jointed to a vertically extending rack 49. This rack extends up behind the dial-plate 4 and engages a small pinion 50 carried by an arbor 51 centrally located with reference to the dial. Coöperative engagement between the rack and pinion is enforced by a weight 49$^a$ supported on a stem which projects from the rack at or about its point of union with the arm 44$^b$. The arbor 51 carries a pointer 52 extending over the dial and having a short oppositely extending arm carrying a counter-balancing weight-disk 53 and supplemental weight-bars 53$^a$ adjustably held in place by a screw 53$^b$ entering the center of the weight-disk 53. The arbor is supported at its rear end in an adjustable bearing 54 at the back of the casing and at its forward end in a bearing at the lower end of a depending arm 56 of a bracket 57 secured to the front of the casing. Additional bearings for the arbor are preferably provided by the peripheries of disks 58 journaled in a bracket 59 carried by a vertical bar 60 which extends across the open center of the dial. The rack 49 is preferably guided between lugs of a bracket 61 secured to the back of the casing as shown in Fig. 2. The dial is preferably arranged behind a glass 62 which may be rendered opaque at the middle to conceal the above-described mechanism, exposing to view only the dial and that portion of the pointer which extends over the same. The glass is held in a suitable collet 63 fastened to the casing and of such dimensions as to accommodate the pointer and its bearing-arm 56 behind the glass.

The operation will be obvious. The load drawing downwardly on the rod 11 tilts the scale-beam and swings the pendulum to the right as the parts are viewed in Fig. 1. The resultant elevation of the arm or extension 44$^b$ causes advance of the pointer the proper distance through coöperation of the rack and pinion.

It will be seen that with the above-described construction, which employs no springs, articles can readily be weighed in quick succession without requiring any intermediate adjustments except in the case of varying tares. The tare-beam is at a convenient place so that the operator standing in front of the apparatus and receiving the articles over a platform from a conveyer can not only immediately ascertain the weight from the position taken up by the pointer but can readily adjust the tare weight as conditions require.

The separate adjustments for different moving members of the structure provide for independent regulation and this will be found to greatly facilitate putting the scales exactly on balance.

What is claimed is:

1. In apparatus of the character described, the combination of a scale-beam, a pivotal support therefor, a pendulum with lateral extensions at its pivoted end, one extending out over one arm of said beam and the other extending out over the other arm of the beam, operating connections between one of said extensions and one end of the scale-beam, an indicator, and operating connections between the same and the other of said lateral extensions of the pendulum.

2. In apparatus of the character described, the combination of a scale-beam, a pivotal support therefor, a lever with oppositely extending arms pivoted directly above said beam, a connection from one of said arms to the scale beam, a dial, a pivoted pointer co-operating with the dial, a pinion upon the axis of the said dial, a rack in mesh with said pinion, and pivotally connected with the arm of said lever opposite to that connected to the scale beam, and a pendulum rigid with said lever, and adapted to swing in an arc above the scale beam.

3. In apparatus of the character described, the combination of a scale-beam, a pivotal support therefor, a pendulum with lateral extensions at its pivoted end, one extending out over one arm of said beam and the other extending out over the other arm of the beam, operating connections between one of said extensions and the scale-beam, an indicator, operating connections between the same and the other of said lateral extensions of the pendulum, and a tare-beam and weight mounted on the front side of the scale-beam.

4. In apparatus of the character described, the combination of a scale-beam, a pivotal support therefor intermediate its ends, a pendulum with lateral extensions at its pivoted end, one extending out over one arm of said beam and the other extending out over the other arm of the beam, operating connections between one of said extensions and one end of the scale-beam, an indicator, operating connections between the same and the other of said lateral extensions of the pendulum, and a tare-beam and weight mounted on the front side of the scale-beam and extending on opposite sides of the latter's pivot.

5. In apparatus of the character described, the combination of a suitable inclosing casing for the moving parts, a scale-beam extending cross-wise the casing, a tare-beam secured to the scale-beam on the exterior of the casing and carrying a weight, a pendulum having lateral extensions at its pivotal end mounted directly above the scale beam and swinging thereover, operating connections between one of said extensions and the scale-beam, a dial on the casing, a pointer working over the dial, and operating connections between said pointer and the other lateral extension of the pendulum.

6. In a scale, the combination of an inclosing casing, an indicating section carried thereby, an index, pendulum, and lever fulcrumed within the inclosing casing, a tare beam arranged in front of the casing and mounted upon said lever, operative connections between the said lever, said pendulum and said index, and a connection on said lever for connecting it to the platform.

7. In a scale, an inclosing casing, a lever fulcrumed within said casing, a tare beam without the casing attached to said lever, an index hand, a pendulum, connections from the pendulum to the index hand and connections between the lever and the pendulum.

8. A counterbalancing and weight indicating mechanism for a platform scale comprising a beam, a lever pivoted directly above the beam, a connection from one end of the lever to the corresponding end of the beam, a connection on the same end of the beam for uniting the latter with the platform, an indicator, a connection from the other end of the lever to the indicator and a pendulum carried by and rigid with the lever.

9. A counterbalancing and weight indicating mechanism for platform scales comprising a casing, a beam inclosed and pivoted therein, a lever pivoted and inclosed within the casing directly above the beam, a pendulum integral with the lever and swinging above the beam, a connection from one end of the lever to the corresponding end of the beam, a means on the same end of the beam for connecting the same to a platform, an indicator arranged above the lever and a rack and pinion connection from the other arm of the lever to the indicator.

10. In a weighing scale, the combination of an inclosing casing, an indicator carried thereby, a lever fulcrumed within the casing, means for connecting a platform thereto, a second lever directly above the first said lever within the casing having a pendulum depending therefrom, a connection between said levers, a tare beam arranged without the casing directly in front of and secured to one of said levers, and operative connections between one of said levers and the indicator.

11. In a weighing scale, the combination with an inclosing casing, an indicator carried thereby, a lever fulcrumed within the casing, platform connections on said lever, a second lever within the casing directly above the second said first-mentioned lever having a pendulous weight secured thereto, a connection between the second said levers on the same side of the fulcrum of each, a tare beam arranged outside of the casing and secured to one of said levers, and operative connections between the uppermost of said levers and the indicator.

12. In a weighing scale, the combination of an inclosing casing, an indicator thereon, a scale beam mounted within the casing, a pendulum, a second beam directly above said scale beam secured to and extending on opposite sides of said pendulum, operative connections between one extension of the second said beam and the scale-beam, operative connections between the other extension of the second said beam and the indicator, and a tare beam arranged outside the casing and carried by one of said two first-mentioned beams.

13. In a weighing scale, the combination of an inclosing casing, a dial arranged thereon, a pointer coöperating with said dial, a scale-beam within the casing, a pendulum, a beam secured to and extending on opposite sides of said pendulum, counterbalancing weights on one extension of said beam, operative connections between this extension and the scale beam, operative connections between the other extension of said beam and the pointer, and a tare beam arranged outside the casing and carried by one of said two first-mentioned beams.

LEWIS C. WETZEL.

Witnesses:
M. L. THOMPSON,
ALLEN DE VILBISS, Jr.